United States Patent [19]

Seino et al.

[11] Patent Number: 4,809,802
[45] Date of Patent: Mar. 7, 1989

[54] STRUCTURE FOR TWO-WHEELED VEHICLE

[75] Inventors: Tatsuji Seino, Fujimi; Nobuo Oshikiri, Kawagoe, both of Japan

[73] Assignee: Honda Giken Kogyo Kabushiki Kaisha, Tokyo, Japan

[21] Appl. No.: 21,902

[22] Filed: Mar. 4, 1987

[30] Foreign Application Priority Data

| Mar. 7, 1986 | [JP] | Japan | 61-32891[U] |
| Mar. 7, 1986 | [JP] | Japan | 61-32892[U] |
| Mar. 7, 1986 | [JP] | Japan | 61-32893[U] |
| Mar. 8, 1986 | [JP] | Japan | 61-33434[U] |
| Mar. 8, 1986 | [JP] | Japan | 61-50793 |

[51] Int. Cl.[4] .................................. B60G 7/02
[52] U.S. Cl. ........................ 180/231; 180/227; 180/72; 180/75
[58] Field of Search ............ 180/227, 231, 217, 70.1, 180/71, 72, 75; 280/284, 288

[56] References Cited

U.S. PATENT DOCUMENTS

| 4,170,369 | 10/1979 | Strutman | 280/288 |
| 4,541,502 | 9/1985 | Iwai et al. | 180/217 |
| 4,553,622 | 11/1985 | DeCortanze | 180/227 |
| 4,638,881 | 1/1987 | Morioka et al. | 180/219 |
| 4,659,097 | 4/1987 | Küpper et al. | 280/288 |

FOREIGN PATENT DOCUMENTS

53-237/78 12/1978 Japan.

Primary Examiner—David M. Mitchell
Attorney, Agent, or Firm—Lyon & Lyon

[57] ABSTRACT

A structure for supporting the rear wheel of an automotive two-wheeled vehicle includes a swing arm having its front end supported on a body frame in a verically oscillating manner, an axle case fixedly secured at the rear end of the swing arm, an axle rotatably supported in the axle case through bearing members, a rear wheel removably mounted on one extending end portion of the axle from one side of the swing arm, and a power transmission member removably attached to the other extending end portion of the axle from the other side of the swing arm.

11 Claims, 9 Drawing Sheets

STRUCTURE FOR TWO-WHEELED VEHICLE

FIELD OF THE INVENTION AND RELATED ART STATEMENT

The present invention relates to a structure for supporting the driving or rear wheel of an automotive two-wheeled vehicle and, more particularly, to such a structure making use of a cantilever type swing arm.

For instance, U.S. Pat. No. 4,553,622 specification teaches an assembly for supporting the driving wheel of an automotive two-wheeled vehicle with a cantilever type swing arm. Such a driving wheel-supporting assembly has a swing arm mounted at its front end to a vehicle body in vertically oscillating fashion and an axle rotatably supported at the rear end of the swing arm through two bearings. The axle has both its ends extending from both sides of the rear end of the swing arm by the predetermined amount of length, and is fixedly provided at one end with the driving rear wheel and at the other end with a sprocket for transmitting the driving force of an engine to the driving wheel by way of a chain.

In order to provide for smooth rotation of the axle by increasing the span between both bearings, it has been required to widen the axle-supporting part of the rear end of the swing arm. For that reason, the prior art assembly has been disadvantageous in that the weight of the swing arm is increased with the resulting increases in the weight of the part located below buffer means for the driving wheel (hereinafter called the part-below-spring).

OBJECT AND SUMMARY OF THE INVENTION

A primary object of the present invention is to assure a sufficient span between both bearing members for supporting an axle so as to allow smooth rotation of the axle, and reduce the weight of a swing arm for the purpose of reducing the weight of the part-below-spring.

According to the present invention, this object is achieved by the provision of a structure for supporting the driving or rear wheel of an automotive two-wheeled vehicle represented as by a motorcycle, which includes a swing arm having at its rear end a supporting bore extending widthwise through a vehicle body and having its front end supported on the vehicle body in a vertically oscillating manner, an axle case having an axle-supporting bore extending widthwise through the vehicle body and both its ends projecting from both sides of the swing arm by the predetermined amount of length and fitted into the supporting bore, bearing members disposed in both projecting end portions of the axle case, an axle having both its ends projecting from both ends of the axle case by the predetermined amount of length distances and rotatably supported in the axle-supporting bore through the bearing members, a rear wheel removably attached to one projecting end portion from one side of the swing arm, and a power transmission member mounted on the other projecting end portion of the axle from the other side of the swing arm for transmitting the driving force of a power unit to the axle by way of an endless type transmission member.

DETAILED DESCRIPTION PREFERRED EMBODIMENTS

Reference will first be made to one embodiment of the present invention shown in FIGS. 1 to 9.

Figure 1:
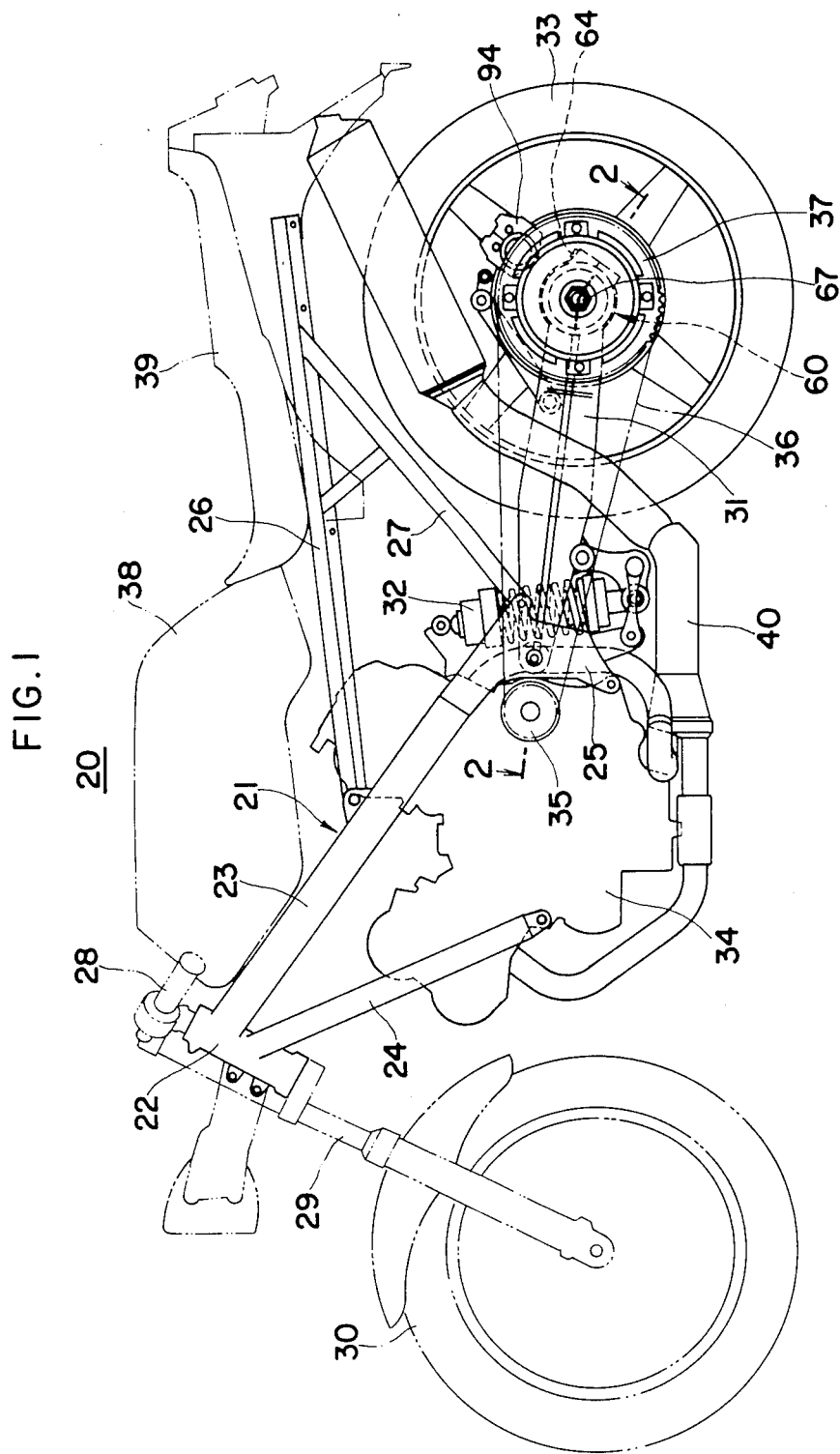
FIG. 1 is an elevational view, partly in phantom, illustrating an automotive two-wheeled vehicle according to the invention.

Referring to FIG. 1, an automotive two-wheeled vehicle shown generally at 20 includes a body frame 21 comprising a head pipe 22, a pair of main frames 23 having their front ends fixedly secured to the head pipe 22 and their rear ends extended rearwardly, a pair of downtubes 24 having their front ends fixedly secured to the head pipe 22 and their rear ends extended downwardly and angularly and a pair of gusset plates 25 secured to the rear ends of the main frames 23. It is noted that reference numerals 26 and 27 stand for a pair of seat rails and a pair of seat rail stays, respectively.

The head pipe 22 is supported with a front fork 29 steerable by a handle bar 28, which fork 20 is rotatably supported at its lower end with a front wheel 30.

A driving rear wheel 33 is suspended on the rear portion of the body frame 21 by means of a cantilever type swing arm 31 and a rear suspension unit 32. The body frame 21 is incorporated therein with a power unit 34, the driving force of which is transmitted to a driven sprocket 37 that is a power transmission member through a driving sprocket 35 and a chain 36 that is an endless type transmission member. It is again noted that reference numerals 38, 39 and 40 indicate a fuel tank, a seat and an exhaust pipe.

Figure 2:
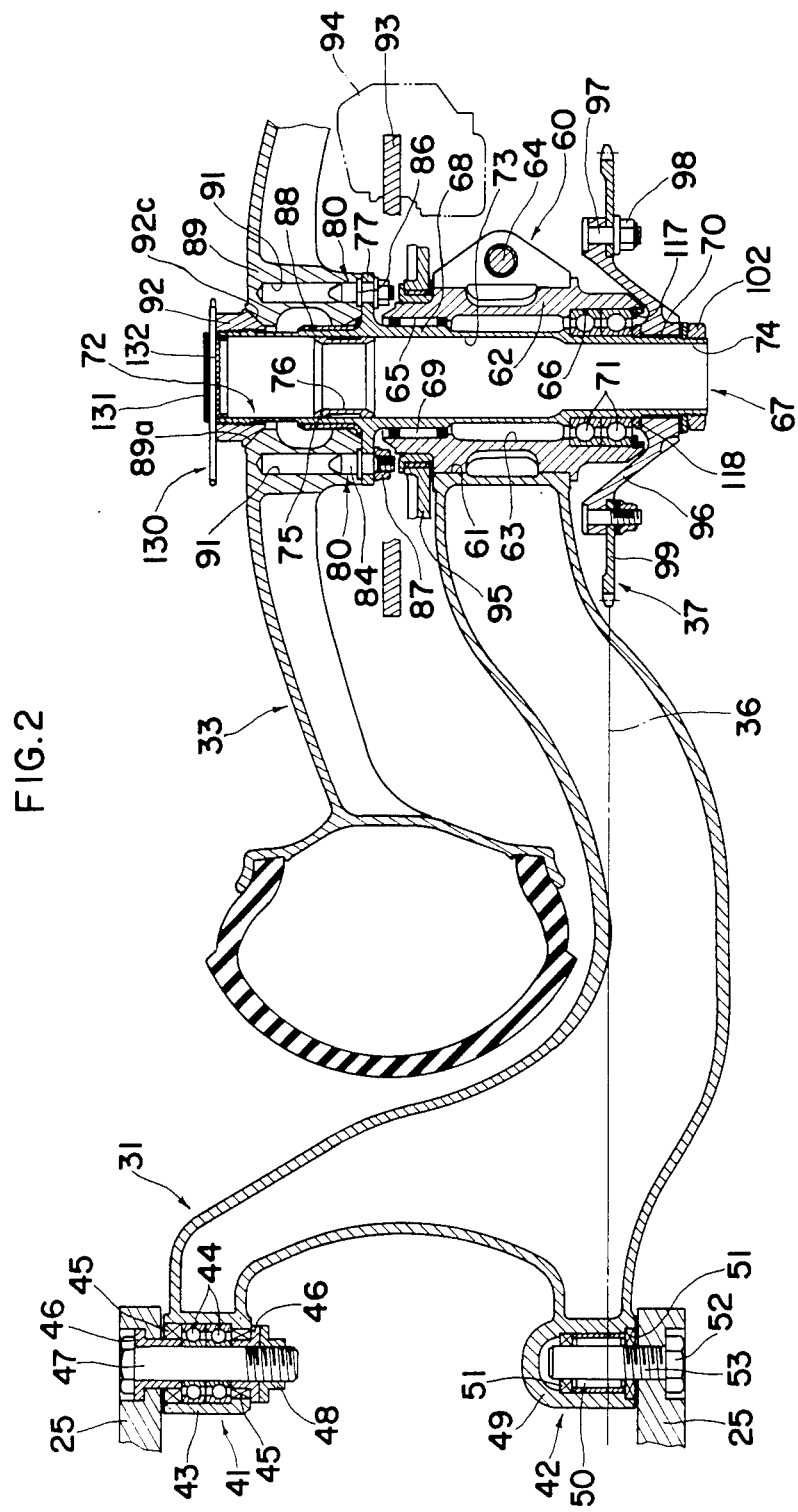
FIG. 2 is a sectional view taken along line 2—2 of FIG. 1.

As illustrated in FIG. 2, the swing arm 31 is provided on its front portion with righthand and lefthand pivotal units 41 and 42. The righthand pivotal unit 41 is provided with a bearing holder 43 having two sets of built-in ball bearings 44. A pair of dust seals 45 and 45 and a pair of flanged collars 46 and 46 are provided on both sides of the ball bearings 44, the outside of which is superposed on the inside of the righthand gusset plate 25 for coupling with a pivot bolt 47. A threaded end of the pivot bolt 47 is projected inside of the righthand pivotal unit 41, and is clamped with a nut 48. On the other hand, the lefthand pivotal unit 42 is provided with a bottomed bearing holder 49 which includes therein a needle bearing 50, on both sides of which a pair of dust seals 51 and 51 are mounted. Further, the outside of the lefthand pivotal unit 42 is superposed on the lefthand gusset plate 25, and is coupled thereto by means of a pivot bolt 52. The pivot bolt 52 is provided in the vicinity of its head with a threaded portion 53 for threadedly connecting it with the lefthand gusset plate 25, whereby a pivotal structure is achieved, wherein the pivot bolt 52 and the lefthand gusset plate 25 are movable relatively to each other in the thrust direction.

Figure 3:
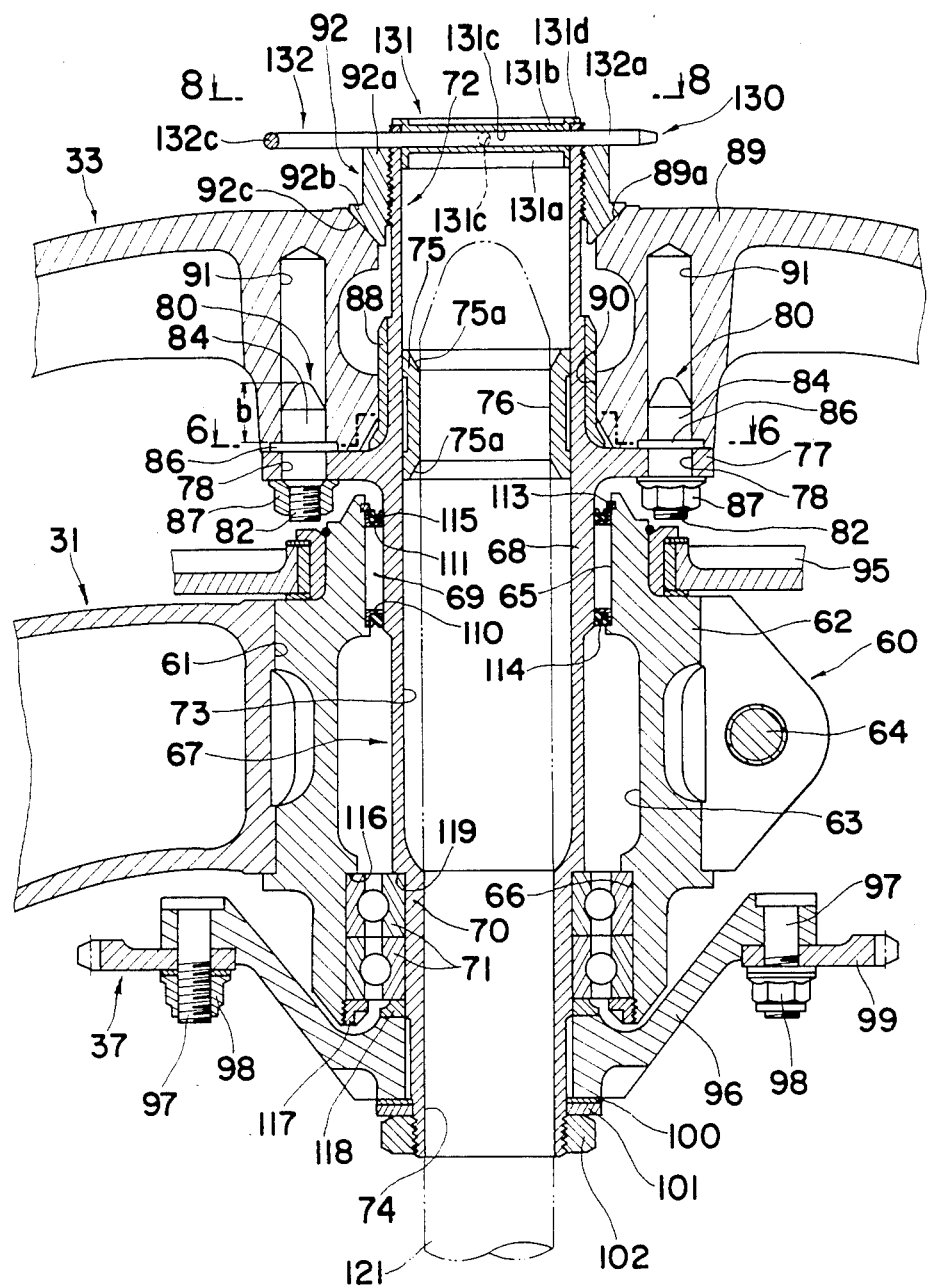
FIG. 3 is an enlarged view illustrating part of the rear wheel supporting mechanism according to the invention.

As depicted in FIGS. 2 and 3, the swing arm 31 is provided at its rear end with a split type holder 60 formed of upper and lower parts, which has a supporting bore 61 extending widthwise through the vehicle body. Into the supporting bore 61 in the holder 60, there is fitted an axle case 62 having an axle-supporting bore 63 extending widthwise through the vehicle body. The length of axle case 62 is longer than the width of the holder 60 of the swing arm 31, and extends from both ends of the holder 60 by the predetermined amount of length. Then, the axle case 62 is mounted against rotation to the holder 60 by clamping together the upper and lower parts thereof by a bolt 64. On the inner faces of the bores 63 in the extensions from both ends of the axle case 62, there are respectively formed bearing holders 65 and 66. An axle shown generally at 67 is removably inserted into the bearing holders 65 and 66 from one side of the swing arm 31 (from above in FIG. 3).

The axle 67 includes one portion of an increased outer diameter and the other portion of a decreased outer diameter. The increased-diameter portion, indicated by 68, is rotatably supported in the bearing holder 66 by means of a needle bearing 69, while the decreased-diameter portion, indicated by 70, is rotatably supported in the bearing holder 66 by means of two sets of ball bearings 71. Both ends of the axle 67 project from both sides of the axle case 62 by the predetermined amount of length. The axle 67 includes a bore 72 extending widthwise through the vehicle body, which is comprised of an increased diameter-bore portion 73 corresponding to said increased-diameter axle portion 68 and a decreased-diameter bore portion 74 corresponding to said decreased-diameter axle portion 70. In the increased diameter-bore portion 73, there is fitted a collar member 75 having a through-hole 76 having the same diameter as that of the decreased-diameter bore portion 74.

Figure 6:
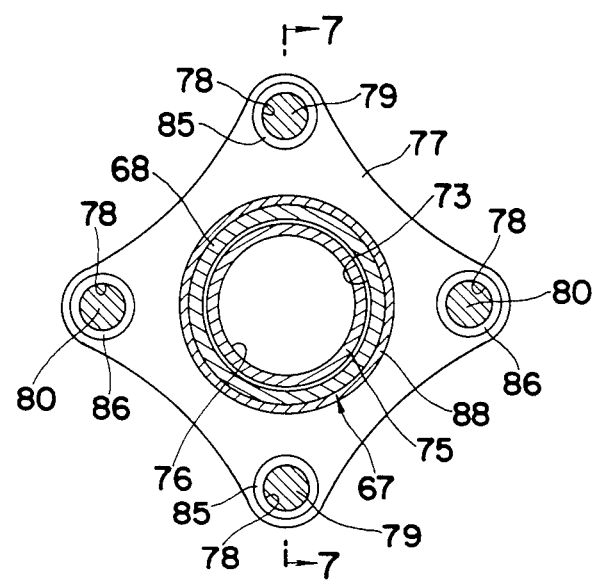
FIG. 6 is a sectional view taken along line 6—6 of FIG. 3.
Figure 7:
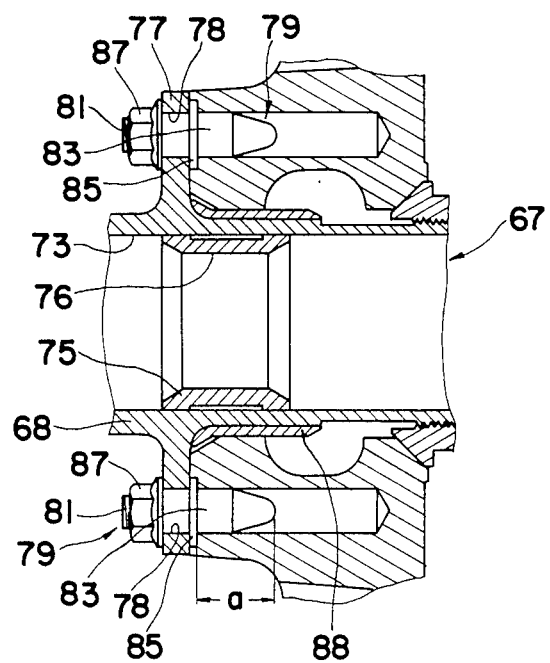
FIG. 7 is a sectional view taken along line 7—7 of FIG. 6.

The increased-diameter portion 68 of the axle 67, projecting from one side of the axle case 62, is provided with a flange 77 for mounting the rear wheel as an intergral part with the axle 67. As depicted in FIGS. 3, 6 and 7, the flange 77 is formed with four mounting holes 78 at equal intervals, through which two types of supporting pins 79 and 80 having different length are passed for being fixed to the flange 77.

The supporting pins 79 and 80 are formed at their respective ends with threaded portions 81 and 82 each of a decreased diameter, and have their shaft portions provided therearound with stopper flanges 85 and 86.

The shaft portions 83 and 84 of the supporting pins 79 and 80 are tapered at their extremities. The length a of each shaft portion 83 of one set of supporting pins 79 is longer than the length b of each shaft portion 84 of the other set of supporting pins 80.

The supporting pins 79, 79, each of an identical length, and the supporting pins 80, 80, each of an identical length, are then fixedly secured to the flange 77 by inserting their threaded portions 81 and 82 into the opposite mounting holes 78 and 78 from the side on which the wheel is to be mounted, screwing nuts 87 onto the threaded portions 81 and 82 projecting toward the opposite side of the flange 77 on which no wheel is to be mounted, and clamping the nuts 87 to allow the stopper flanges 85 and 86 to abut against the side of the flange 77 and the shaft portions 83 and 83 to project toward the side on which the wheel is to be mounted. By mounting the supporting pins 79 and 80 in this manner, it is possible to achieve easy axial alignment of the supporting pins 79 and 80 with respect to the mounting holes 78 with improved precision.

A ring-like spacer 88 is fitted over the increased-diameter portion 68 of the axle 67, and is provided therearound with area wheel 33. The rear wheel 33 includes a wheel hub 89 having a bore 90 through which the axle is passed, and which is larger in outer diameter than the increased-diameter axle portion 68. The wheel hub 89 is provided therein with four holes 91 for receiving the supporting pins 79 and 80 at equal intervals corresponding thereto. The rear wheel 33 is inserted onto the increased-diameter axle portion 68 and fitted over the spacer 88, and the supporting pins 79 and 80 are inserted in the holes 91 to mount it to the axle 67 for rotation therewith with the use of a nut member 92 screwed onto one threaded end portion of the axle 67. In this manner, the attachment or detachment of the rear wheel 33 to or from the axle 67 is precisely and easily achieved, since the supporting pins 79 and 80 have varied length, and the extremities of the supporting pins 79 and 80 are tapered. In addition, the provision of the spacer 88 between the rear wheel 33 and the axle 67 allows the rear wheel 33 to be attached to the axle 67 without any play and with improved precision, and makes it possible to reduce loads applied on the supporting pins 79 and 80. In addition, if a number of spacers having varied thickness are prepared, it is then possible to attach the rear wheel 67 to the axle 33 with improved precision by fitting a spacer accommodating to the inner diameter of the axle-inserting bore 89 of the wheel hub 89 of the rear wheel 33.

It is noted that reference numerals 93, 94 and 95 indicate a disc rotor fixedly secured to the flange 77, a brake caliper for braking the disc rotor 93 and a bracket for supporting the caliper 94, respectively.

The driven sprocket 37 mounted on the other projecting end portion of the axle 67 is comprised of a hub member 96 and a sprocket member 99 attached thereto by means of a bolt 97 and a nut 98. Then, the driven sprocket 37 is serration-engaged with the other projecting end portion of the axle 67 for rotation therewith, and is mounted in place by an axle nut 102 screwed onto said other projecting end portion through washers 100 and 101.

Figure 4:
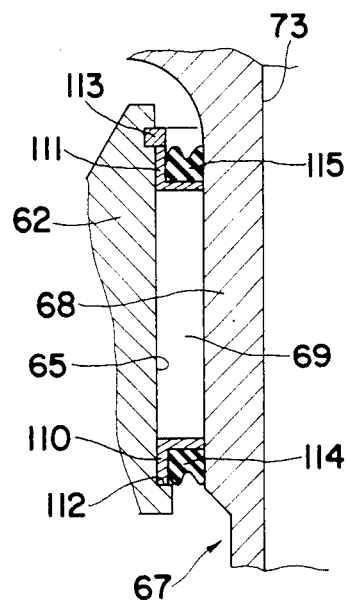
FIG. 4 is an enlarged sectional view illustrating the needle bearing member of the invention.

As illustrated in FIG. 4, the needle bearing 69 is held at both its ends with thrust washers 110 and 111, and is attached to the axle case 62 by allowing one thrust washer 110 to abut against a step 112 formed on the axle case 62 and the other thrust washer 111 to abut against a circlip 113 fitted into the axle case 62. On the outside of the thust washers 110 and 111, there are dust seals 114 and 115. The shaft portion 68 of the axle 67 supported by the needle bearing 69 receives a large torque by the use of a disc brake. According to this invention, however, this shaft portion 68 can resist to a large torque produced during braking by designing it to be of a large diameter and by supporting it by the needle bearing 69.

The ball bearing 71 is attached to the bearing holder 66 by a step 116 and a stopper ring 117 of the bearing holder 66 of the axle case 62. There is a spacer 118 between the ball bearing 71 and the hub member 96 of the driven sprocket 37.

The axle 67 is provided therearound with a step 119, which is allowed to abut against the ball bearing 71, whereby it is prevented from displacing toward the driven sprocket 37. The axle 67 is also designed to be prevented from displacing toward the rear wheel 33 by screwing the axle nut 102 onto the other end thereof.

Figure 5:
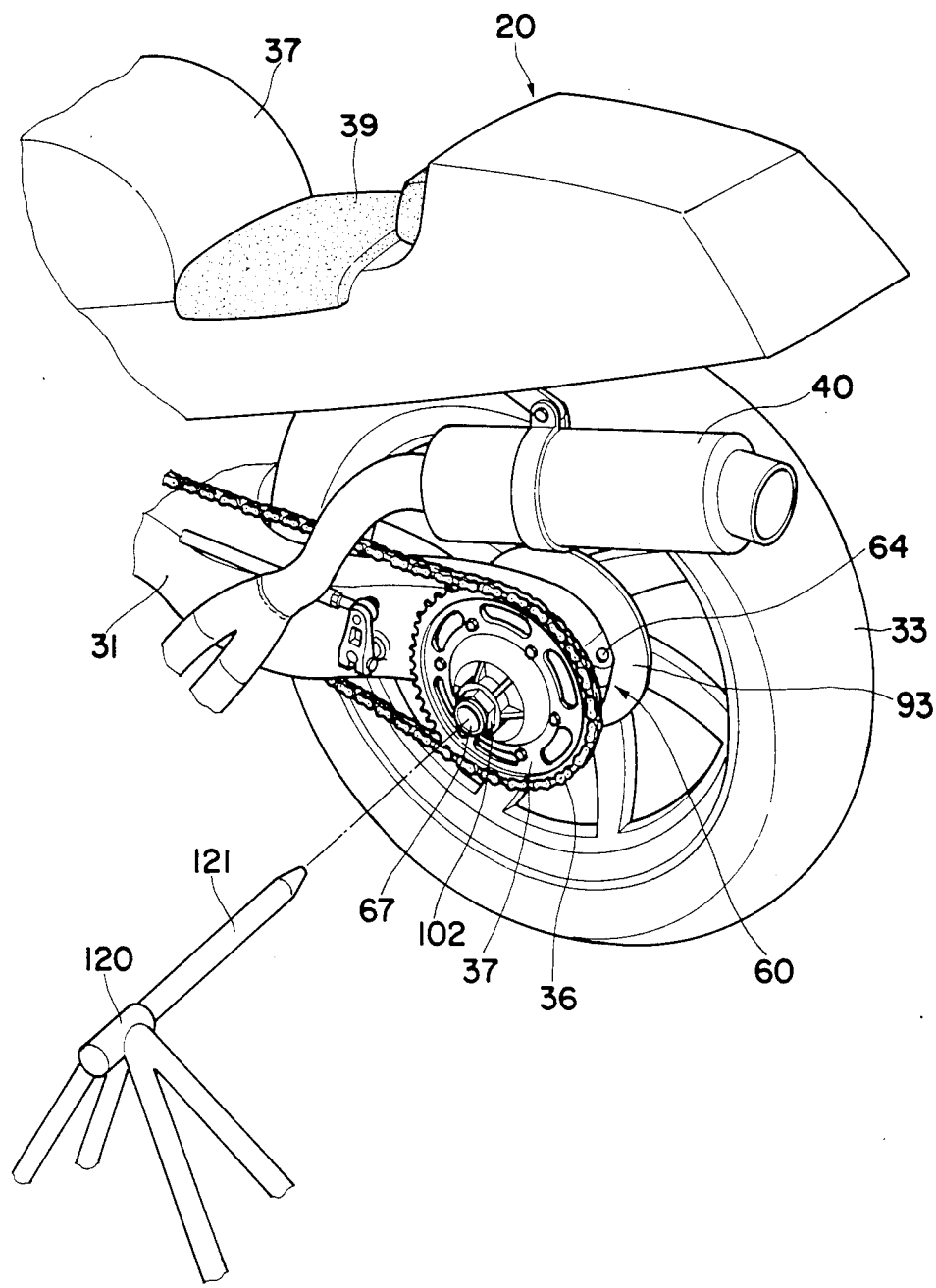
FIG. 5 is a perspective view illustrating the rear portion of the vehicle and stand.

The collar member 75 formed on the axle 67 is provided to hold the automotive two-wheeled vehicle 20 in an upright state by such a stand 120 as shown in FIG. 5. More specifically, when the supporting shaft 121 extending from the stand 120 is inserted into the bore 72 of the axle 67 from the other end thereof, it supports the inner diameter portions of the decreased-diameter bore portion 74 and the through-hole 76 of the collar member 75, whereby the vehicle body is supported in place, while the rear wheel 33 attached to one end of the axle 67 is spaced away from the ground.

In this case, the supporting shaft 121 of the stand 120 is tapered at the extremity, and is provided with tapered guide faces 75a and 75b at both its ends, so that its insertion into the through-hole 76 in the collar member 75 is facilitated.

It is thus possible to achieve easy maintenance and ready replacement of parts by holding the automotive two-wheeled vehicle 20 in an upright state by the stand 120.

The nut member 92 screwed onto one end of the axle 67 is prevented from unscrewing by unscrewing-preventing means 130.

Figure 8:
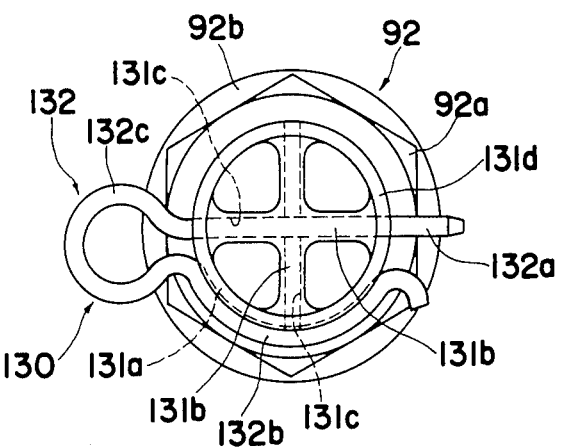
FIG. 8 is a sectional view taken along line 8—8 of FIG. 3.
Figure 9:
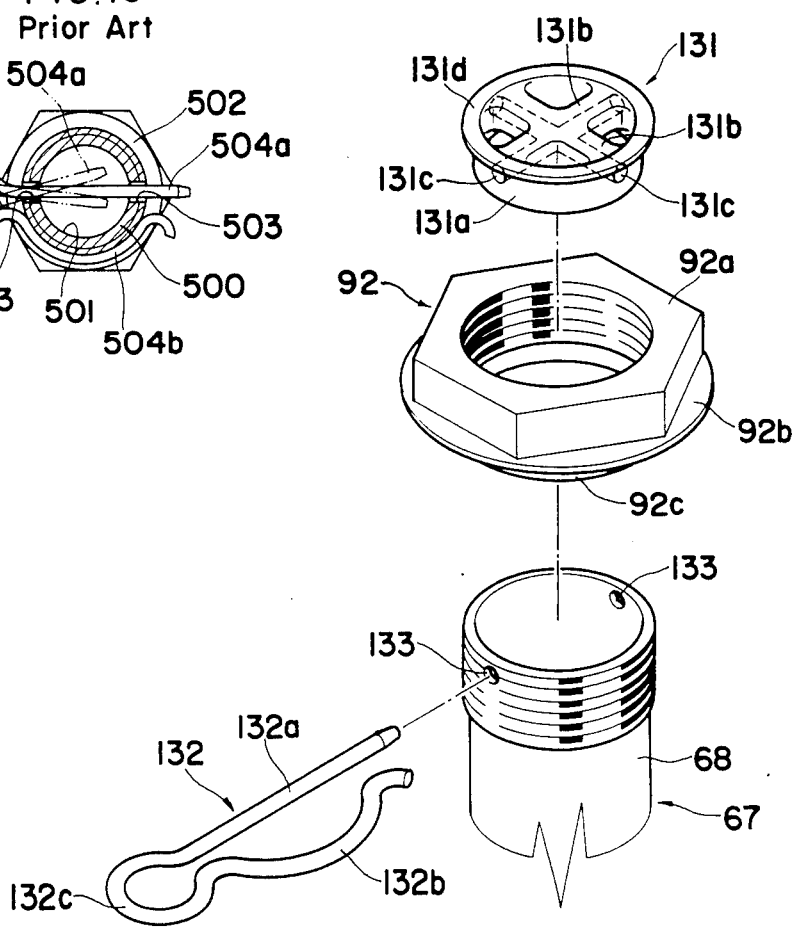
FIG. 9 is an exploded perspective view illustrating the nut lock apparatus shown in FIG. 8.

As depicted in FIGS. 3, 8 and 9, the nut member 92 includes a hexgonal barrel portion 92a with which a tool is to be engaged, a flange 92b which is larger in diameter than the portion 92a, and a tapered face 92c formed around the outer end of the flange 92b, which face 92c is to engage a tapered face 89a formed at the opening end of the wheel hub 89. Screwing of the nut member 92 causes engagement of the tapered face 89a with the tapered face 92c and, hence, the wheel hub 89 with the flange 77, whereby the rear wheel 33 can be fixedly secured to the axle 67 with each and improved precision.

The unscrewing-preventing means 130 contains a pin guide member 131 and a split pin 132, as depicted in FIGS. 3, 8 and 9.

The pin guide 131 includes a ring member 131a to be inserted into the opening end of the increased-diameter bore portion 73 of the axle 67, two ribs 131b, each having a bore 131c, which are provided crosswise to the ring member 131a as integral parts therewith, and a flange 131d extending from the ring member 131a as an integral piece, which is to abut against the outer face of the extremity of one projecting end portion of the axle 67. It is noted that this pin guide 131 is formed of a lightweight material such as plastics or aluminium.

The split pin 132 is constructed from a linear portion 132a to be inserted into diametrically opposite pin holes 133 and 133 formed in one projecting end portion of the axle 67 and the bores 131c in the pin guide member 131, an engaging portion 132b of an arcuate shape which is to be engaged with the outer periphery of the ring member 131a of the pin guide member 131, and a spring portion 132c for connecting the linear portion 132a with the engaging portion 132b.

After the nut member 92 has been screwed onto one projecting end portion of the axle 67, the ring member 131a of the pin guide member 131 is inserted in the opening end of the increased-diameter bore portion 73 of the axle 67, while the flange 131d is allowed to abut against said opening end and the bores 131c of the ribs 131b are in alignment with the pin holes 133 in the axle 67. The linear portion 132a of the split pin 132 is inserted in both holes and bores 133 and 131c, and the engaging portion 132b is engaged with the ring member 131a of the pin guide member 131, whereby the nut member 92 remains unscrewed.

By constructing the means 130 as described above, it is possible to rapidly and easily attach or detach the means 130 to or from the axle 67.

Figure 10:
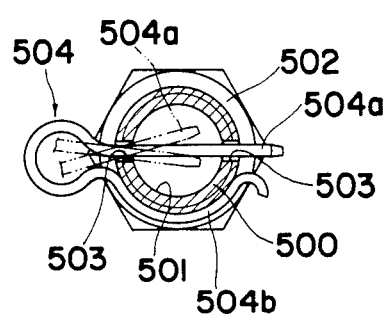
FIG. 10 illustrates a nut lock apparatus according to the prior art.

As depicted in FIG. 10, the conventional means for preventing unscrewing of a nut member 502 screwed onto one end of an axle 500 having a bore 501 is designed to insert a linear portion 504a of a split pin 504 into diametrically opposite pin holes 503 and 503 formed in the one end of the axle 500 and engaging an engaging portion 504b of the split pin 504 around the axle 500. When it is intended to mount the split pin 504 in place, therefore, the portion 504a inserted into one pin hole 503 tends to incline, as indicated by a chain line, so that difficulty is experienced in inserting it into the other pin hole 503.

If the means 130 according to the instant embodiment as mentioned above and illustrated is used, however, then the linear portion 132a of the split pin 132 is guided into the bores 131c of the pin guide portion 131 for rapid and assured attachment.

Referring then to FIG. 3, the attachment or detachment of the rear wheel 33 and the driven sprocket 37 will be explained.

The axle 67 is inserted from the side of the axle case 62 on which the needle bearing 69 is mounted until the step 119 of the axle 67 is brought into abutment against the ball bearing 71, and the spacer 118 is inserted into the other end portion of the axle 67 projecting from the other end of the axle case 62. Next, the hub member 96 of the driven sprocket 37 is inserted for serration engagement with the axle 67, followed by further insertion of the washers 100 and 101. Thereafter, it is screwed into the axle nut 102 to fit rotatably the axle 67 in the axle case 62, whereby any axial movement of the axle 67 is restrained.

On the other hand, the wheel hub 89 of the rear wheel 33 is inserted into one projecting end portion of the axle 67 through the spacer 88, and the supporting pins provided on the flange 77 of the axle 67 is inserted into the pin-inserting bores 91 to support the rear wheel 33 by the axle 67 for rotation therewith. Further, the nut member 92 is screwed onto the one projecting end portion of the axle 67 to bring the wheel hub 67 in engagement with the flange 77 and thereby attach the rear wheel 33 to the axle 67. The pin guide member 131 is attached to the extremity of the one projecting end portion of the axle 67, while the split pin 132 is inserted through the axle 67 and the pin guide member 131, thereby to prevent unscrewing of the nut member 92.

For removing the rear wheel 33 from the axle 67, the split pin 132 is pulled out to remove the pin guide member 131 and unscrew the nut member 92. In this manner, the rear wheel 33 can easily be removed.

For removing the driven sprocket 37, on the other hand, the axle nut 102 is unscrewed. In this manner, the sprocket 37 can easily be removed together with the washers 101 and 100.

Figure 11:
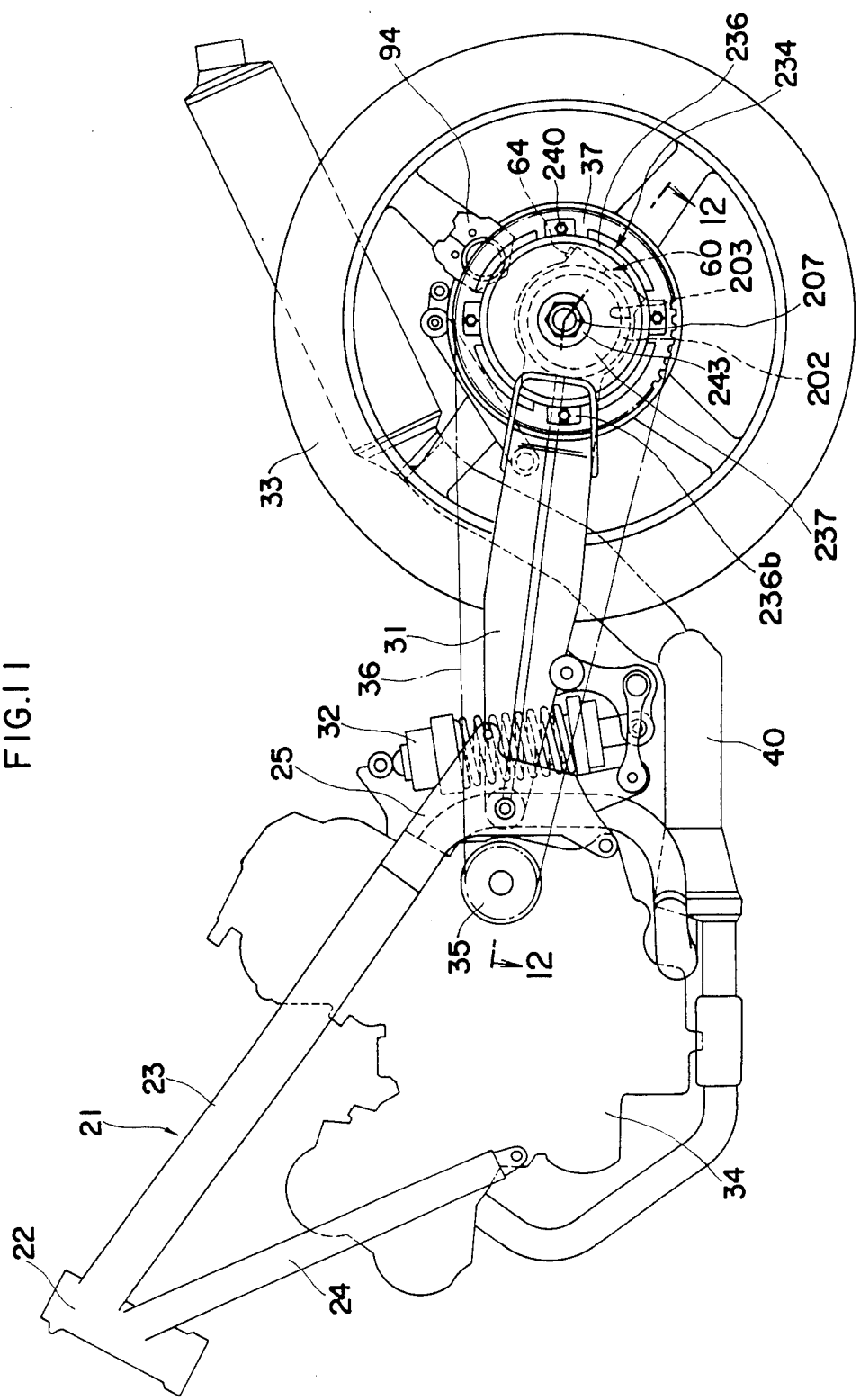
FIG. 11 is a partial elevational view of an automotive two-wheeled vehicle illustrating another embodiment of the present invention.
Figure 12:
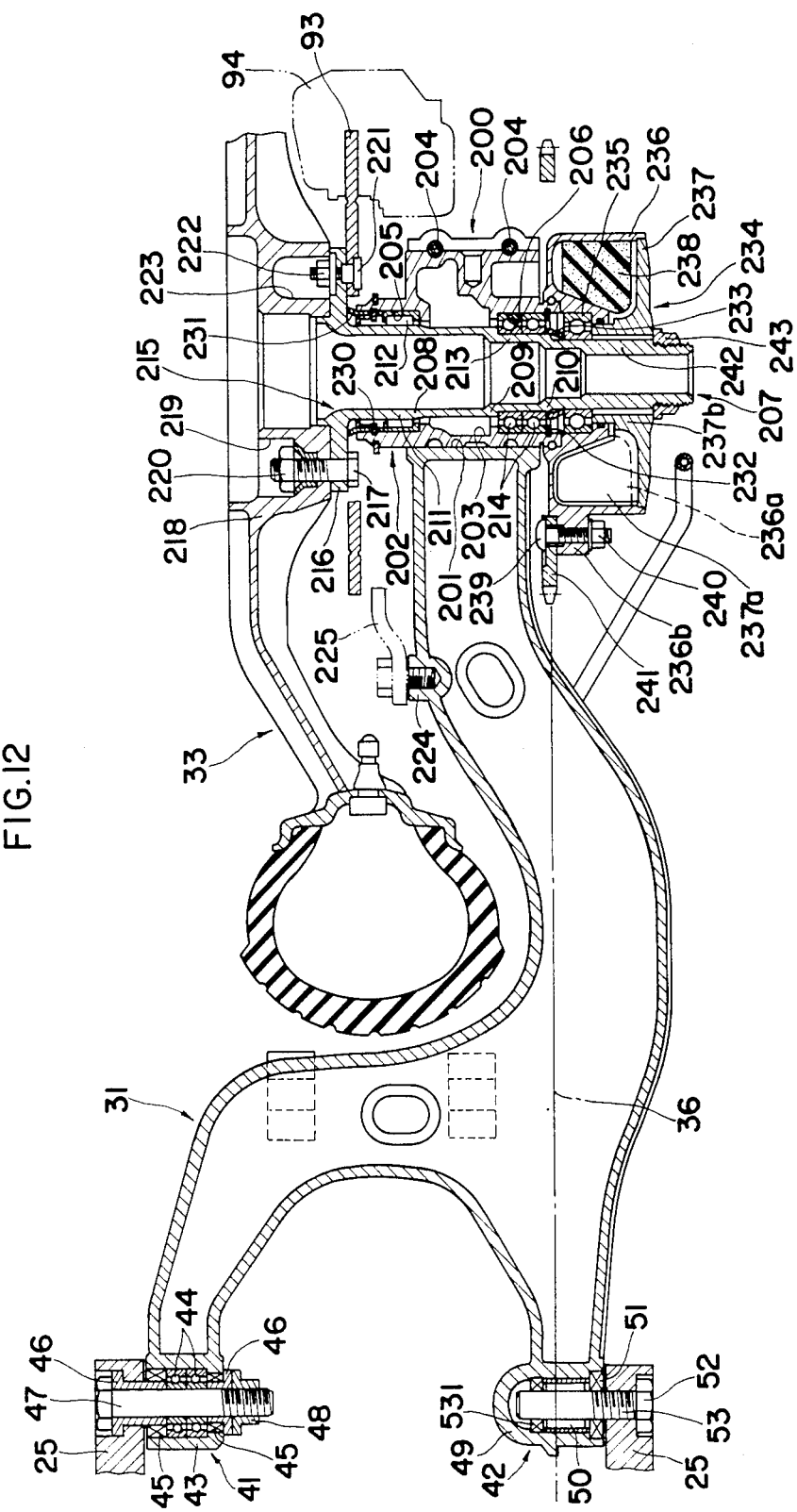
FIG. 12 is a sectional view taken along lines 12—12 of FIG. 11.

Another embodiment of the present invention will be explained with reference to FIGS. 11 and 12.

The swing arm 31 supported at its front end on the body frame 21 in a vertically oscillating manner is provided at its rear end with a split type holder 200 of upper and lower parts, which includes a supporting bore 201 extending widthwise through the vehicle body. In the supporting bore 201 of the holder 200, there is fitted an axle case 202 having an eccentric axle-supporting bore 203 extending widthwise through the vehicle body. The axle case 202 is longer in length than the width of the holder 200 of the swing arm 31, and has its both ends projecting from both sides of the holder 200 by the predetermined amount of length. The axle case 202 is attached against rotation to the holder 200 by clamping together the upper and lower parts thereof by means of bolts 204 and 204. On the inner faces of the eccentric axle-supporing bores 203 of both projecting end portions of the axle case 202, there are bearing holders 205 and 206, respectively. An axle 207 is removably inserted in the bearing holders 205 and 206 from one side of the swing arm (from above in FIG. 12).

The axle 207 is of the largest diameter at one end, and is provided with steps 208, 209 and 210 of decreasing diameters, i.e., is tapered. The axle 207 has its increased-diameter axle portion supported rotatably in the bearing holder 205 by a needle bearing 212 and its first dicreased-diameter axle portion 213 supported similarly in the bearing holder 206 by two sets of ball bearings 214, and has its both ends projecting from both sides of the axle case 202 by the predetermined amount of length. The axle 207 includes a bore 215 extending widthwise through the vehicle body, which is of an increased diameter at one end and of gradually decreased diameters toward the other end.

The increased-diameter axle portion 211 projecting from one side of the axle case 202 is provided with a flange 216 for mounting the rear wheel as an integral part therewith. A plurality of bolts 217 are passed through a plurality of mounting holes formed in the flange 216 at peripherally equal intervals. On the other hand, a wheel hub 218 of the rear wheel 33 is brought into abutment on the outer face of the flange 216. The wheel hub 218 is provided with an outwardly opening recess 219, within which a nut 220 is clamped to the end of the 217 to connect the flange 216 to the wheel hub 218. A disc rotor 93 of a disk brake device is brought into abutment on the inner face of the flange 216, both being connected to each other by a bolt 221 and a nut 222. It is noted that the wheel hub 218 is provided with a spacer 223 for permitting the attachment of the nut 222. It is also noted that the disk brake device is constructed by engaging a torque rod 225 with a boss 224 formed on the swing arm 31, attaching a caliper 94 to the boss 224 and engaging the caliper 94 with the disk rotor 93 at the rear portion of the vehicle body.

The needle bearing 212 is positioned at its end by a thrust washer 230, and held in the bearing holder 205. The thrust washer 230 is provided therearound with a lip seal 231, the lip portion of which is brought into abutment on the inside of the flange 216. The axle 207 supported by this needle bearing 212 receives a large torque by the use of disc braking. According to this embodiment, however, the axle 207 can resist to a large torque produced during braking by designing that portion 211 of the axle to be of an increased diameter and by supporting it by the needle bearing 212.

The ball bearing 214 is held at its end on the bearing holder 206 of the axle case 202 by a circlip 232. On the outside of the circlip 232, the spacer 233 is disposed over the periphery of the step 210 of the axle 203, and is allowed to abut at its one end against a ball bearing 235 supporting a damper unit 234 to prevent disengagement of the bearing 235.

The damper unit 234 is comprised of a cylindrical outer element 236 open at its one end, an inner element 237 fitted into the opening portion of the outer element 236, radial damper blades 236a and 237a extending alternately from both elements and a damper rubber 238 inserted in between the respective blades. The outer element 236 is provided therearound with a plurality of mounting portions 236b to which a driven sprocket 241 is fixedly secured by means of a bolt 239 and a nut 240, and is fitted over the second decreased-diameter portion 242 of the axle 207 through the ball bearing 235 in such a manner that it is freely rotatable. On the other hand, the boss portion 237b of the inner element 237 is coupled to the axle 207 through serration engagement for rotation therewith. An axle nut 243 is screwed onto the other end portion of the axle 207 extending through the center of the inner element 237 and terminating on the side thereof. Any disengagement of the damper unit 234 is prevented by this axle nut 243. The driving rotation force transmitted from the driving sprocket 35 to the driven sprocket 240 through the chain 36 is transmitted from the outer element 236 of the damper unit 234 to the inner element 237 through the damper blade 236a, the damper rubber 238 and the damper blade 237a of the inner element 237 in the form of impact absorption. The rotation of the inner element 237 is tranmitted to the axle 207 through serration engagement, whereby the rear wheel 33 is rotated.

The axle case 202 is fixed against rotation by clamping together the upper and lower parts of the holder 200 of the swing arm 31, as mentioned above. Accordingly, unclamping of the bolt 204 causes that the axle case 202 is made so rotatable that the position of the axle 207 inserted in the eccentric axial bore 203 of the axle case 202 is movable longitudinally with respect to the vehicle body for the adjustment of tension of the chain 36.

The attachment or detachment of the rear wheel 33 and the damper unit 234 formed as an integral part with the driven sprocket 241 will be explained with reference to FIG. 12.

The axle 207 is inserted from the side of the axle case 202 on which the needle bearing 212 is mounted until its step 209 of the axle 207 abuts against the ball bearing 214, and the spacer 233 is inserted from the other end portion of the axle 207 projecting toward the other end of the axle case 202. Then, the damper unit 234 provided with the driven sprocket 241 is inserted for serration engagement with the axle 207. At this time, the ball bearing 235 is inserted between the damper unit 234 and the axle 207 for abutment against the spacer 233. The axle nut 243 is then screwed onto the other projecting end portion of the axle 207 to prevent disengagement of the damper unit 234, whereby the axle 207 is rotatably supported in the axle case 202, but is prevented from axial movement.

On the other hand, the disc rotor 93 is mounted on the flange 216 of the axle 207. The rear wheel 33 is then brought into abutment on the outer face of the flange 216 to mount it on the axle 207 for rotation therewith by means of the bolt 217 and nut 220.

The rear wheel 33 can easily be removed from the axle 207 by unscrewing the nut 220 from the bolt 217 which clamps together the flange 216 and the wheel hub 218.

On the other hand, the damper unit 234 can easily be removed together with the driven sprocket 241 by unscrewing of the nut 243.

According to both embodiments of the present invention, only the flanged side of the axle required to have rigidity is of an increased diameter, but the other end side may be of a decreased diameter, since it receives no particularly large load and is thus not required to have so much rigidity. In this regard, the present invention provides an ideal structure the weight of which is reduced as much as possible. In addition, owing to the integral coupling structure of the flange and axle, the rigidity of the flange is enhanced through that structure, to which the disc rotor may be attached. Unlike the prior art, the disc rotor is not located on the rear wheel side of the vehicle body. Thus, the replacement of the rear wheel may be carried out, while the brake device is left intact. Therefore, the structure of the present invention is best suited for use with racing motorcycles wherein the rear wheels and other parts must be replaced as speedily as possible.

The axle used may be varied in the outer diameters of both its ends, and may thus be tapered without any step. If required, one or more steps may be formed on the axle.

As the power transmission member, a belt type member may be used in place of the chain type member.

What is claimed is:

1. A structure for supporting the rear wheel of an automotive two-wheeled vehicle, including:
   a swing arm having at its rear end a supporting bore extending widthwise through the body of said vehicle and having its front end supported on said body in a vertically oscillating manner,
   an axle case having an axle-supporting bore extending widthwise through said body and both its ends projecting from both sides of said swing arm by a predetermined amount of length and fitted into said swing arm, bearing members disposed in both projecting end portions of said axle case,
   an axle including an increased outer diameter-portion at one end and a decreased outer diameter-portion at the other end and having both its ends projecting from both ends of said axle case by the predetermined amount of length and rotatably supported in the axle-supporting bore through said bearing members,
   a rear wheel removably attached to the projecting end of said increased outer diameter portion of said axle from one side of said swing arm, and
   a power transmission member removably mounted on the other projecting end portion of said axle from the other side of said swing arm for transmitting the driving force of a power unit to said axle by way of an endless type transmission member,
   said axle being fixedly clamped in the supporting bore of the swing arm, and being rotatably supported during adjustment of said endless type transmission member.

2. A structure as claimed in claim 1, wherein said axle case has an eccentric axial bore.

3. A structure for supporting the rear wheel of an automotive two-wheeled vehicle, including:
   a swing arm having at its rear end a supporting bore extending widthwise through the body of said vehicle and having its front end supported on said body in a vertically oscillating manner,
   an axle case having an axle-supporting bore extending widthwise through said body and both its ends projecting from both sides of said swing arm by the predetermined amount of length and fitted into said swing arm, bearing members disposed in both projecting end portions of said axle case,
   an axle having both its ends projecting from both ends of said axle case by the predetermined amount of length and rotatably supported in the axle-supporting bore through said bearing members, said axle including an increased outer diameter-portion on one side and a decreased outer diameter-portion on the other side, one of said bearing members being a needle bearing for supporting said increased outer diameter-portion, and the other of said bearing members being a ball bearing for supporting said decreased outer diameter-portion, said increased outer diameter-portion being located on the rear wheel-supporting side, said needle bearing being located on substantially the center in the widthwise direction of the rear wheel,
   a rear wheel removably attached to one projecting end portion of said axle from one side of said swing arm, and
   a power transmission member removably mounted on the other projecting end portion of said axle from the other side of said swing arm for transmitting the driving force of a power unit to said axle by way of an endless type transmission member,
   said axle case being fixedly clamped in the supporting bore of the swing arm, and being rotatably supported during adjustment of said endless type transmission member.

4. A structure as claimed in claim 3, wherein said axle has a bore extending widthwise through said body, and
   said bore including an increased diameter-portion corresponding to said increased outer diameter-portion of said axle and a decreased diameter-portion corresponding to said decreased outer diameter-portion of said axle, and
   said increased diameter-portion receiving a collar member having a through-hole of the same diameter as that of said decreased diameter-portion.

5. A structure for supporting the rear wheel of an automotive two-wheeled vehicle, including:
   a swing arm having at its rear end a supporting bore extending widthwise through the body of said vehicle and having its front end supported on said body in a vertically oscillating manner,
   an axle case having an axle-supporting bore extending widthwise through said body and both its ends projecting from both sides of said swing arm by a predetermined amount of length and fitted into said swing arm, bearing members disposed in both projecting end portions of said axle case,
   an axle including an increased outer diameter-portion at one end and a decreased outer diameter-portion at the other end and having both its ends projecting from both ends of said axle case by the predetermined amount of length and rotatably supported in the axle-supporting bore through said bearing members, a rear wheel removably attached to the projecting end of said increased outer diameter portion of said axle from one side of said swing arm, a power transmission member removably mounted on the other projecting end portion of said axle from the other side of said swing arm for transmitting the driving force of a power unit to said axle by way of an endless type transmission member, and an exhaust pipe extending only on the side of the swing arm opposite the wheel, said axle case being fixedly clamped in the supporting bore of the swing arm, and being rotatably supported during adjustment of said endless type transmission member.

6. A structure as claimed in claim 5, wherein a thin portion of said exhaust pipe crosses over the swing arm.

7. A structure as claimed in claim 5, wherein the axle case may be fitted to, and removed from the supporting bore of the swing arm from the side of the swing arm opposite to the wheel and that said exhaust pipe is disposed avoiding overlapping the axle case when viewed from the side of the vehicle.

8. A structure for supporting the rear wheel of an automotive two-wheeled vehicle, including:

a swing arm having at its rear end a supporting bore extending widthwise through the body of said vehicle and having its front end supported on said body in a vertically oscillating manner, an axle case having an axle-supporting bore extending widthwise through said body and both its ends projecting from both sides of said swing arm by a predetermined amount of length and fitted into said swing arm, an axle including an increased outer diameter-portion on one end and a decreased outer diameter-portion on the other end and having both its ends projecting from both ends of said axle case by the predetermined amount of length and rotatably supported in the axle-supporting bore through bearing members, said bearing members being disposed in each projecting end portion of said axle case and including a needle bearing for supporting said increased outer diameter-portion and a ball bearing for supporting said decreased outer diameter portion, a rear wheel removably attaced to the projecting end of said increased outer diameter portion of said axle from one side of said swing arm, and a power transmission member removably mounted on the other projecting end portion of said axle from the other side of said swing arm for transmitting the driving force of a power unit to said axle by way of an endless type transmission member, said axle being fixedly clamped in the supporting bore of the swing arm, and being rotatably supported during adjusting of said endless type transmission member.

9. A structure as claimed in claim 15, wherein said increased outer diameter-portion of said axle is located on the rear wheel-supporting side.

10. A structure as claimed in claim 15, wherein said axle has a bore extending widthwise throough said body, and said bore including an increased diameter-portion corresponding to said increased outer diameter-portion of said axle and a decreased diameter-portion corresponding to said decreased outer diameter-portion of said axle, and said increased diameter-portion receiving a collar member having a through-hole of the same diameter as that of said decreased diameter-portion.

11. A structure for supporting the rear wheel of an automotive two-wheeled vehicle, including:

a swing arm having at its rear end a supporting bore extending widthwise through the body of said vehicle and having its front end supported on said body in a vertically oscillating manner, an axle case having an axle-supporting bore extending widthwise through said body and both its ends projecting from both sides of said swing arm by a predetermined amount of length and fitted into said swing arm, bearing members disposed in both projecting end portions of said axle case, an axle having both its ends projecting from both ends of said axle case by the predetermined amount of length and rotatably supported in the axle-supporting bore through said bearing members, a flange on one projecting end portion of said axle, a rear wheel including a wheel hub removably attached to said one projecting end portion from one side of said swing arm, a nut engaging said one projecting end portion to secure said wheel hub to said flange whereby said wheel hub is attached to said axle for rotation therewith by means of a rotation stopping mechanism mounted thereon, means for preventing retrograde movement of said nut on said axle including a pin guide comprising a ring member for insertion into the bore of said one projecting end of said axle, said ring member being formed with a diametral rib having an opening therethrough and an integrally formed flange adapted to abut the outer face of said axle end portion and a split pin inserted into said opening, and a power transmission member removably mounted on the other projecting end portion of said axle from the other side of said swing arm for transmitting the driving force of a power unit to said axle by way of an endless type transmission member, said axle case being fixedly clamped in the supporting bore of the swing arm, and being rotatably supported during adjustment of said endless type transmission member.

* * * * *